(12) United States Patent
Ellis et al.

(10) Patent No.: US 6,615,298 B2
(45) Date of Patent: *Sep. 2, 2003

(54) METHOD AND SYSTEM FOR ESTABLISHING A STANDARD PERIPHERAL INTERFACE SERVER BETWEEN A CLIENT AND A PLURALITY OF PERIPHERALS

(75) Inventors: David A. Ellis, Wallingford, CT (US); Tom Liu, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 6 days.

This patent is subject to a terminal disclaimer.

(21) Appl. No.: 09/883,015

(22) Filed: Jun. 18, 2001

(65) Prior Publication Data

US 2002/0032814 A1 Mar. 14, 2002

Related U.S. Application Data

(63) Continuation of application No. 09/153,775, filed on Sep. 15, 1998, now Pat. No. 6,282,590.

(51) Int. Cl.[7] .............................................. G06F 13/00
(52) U.S. Cl. ............................ 710/63; 710/8; 710/10; 710/62; 709/201; 709/203
(58) Field of Search ................................ 710/8, 10, 62, 710/63; 709/201, 203

(56) References Cited

U.S. PATENT DOCUMENTS

| | | | |
|---|---|---|---|
| 4,574,352 A | 3/1986 | Coppola et al. ............. 705/407 |
| 5,613,148 A | 3/1997 | Bezviner et al. ............ 709/203 |
| 5,682,468 A | 10/1997 | Fortenbery et al. ......... 345/419 |
| 5,689,703 A | 11/1997 | Atkinson et al. ........... 707/103 |
| 5,692,111 A | 11/1997 | Marbry et al. ............. 359/1.15 |
| 5,832,191 A | 11/1998 | Thorne ....................... 395/114 |
| 6,012,083 A | 1/2000 | Savitzky et al. ............ 709/202 |

Primary Examiner—Jeffrey Gaffin
Assistant Examiner—Tammara Peyton
(74) Attorney, Agent, or Firm—Brian A. Lemm; Angelo N. Chaclas; Charles R. Malandra, Jr.

(57) ABSTRACT

The invention is a method and system for providing a standard interface between a client and a plurality of peripheral devices. The interface is established through creating an interface object and/or a peripheral object in an object oriented development environment of a data processing system. The method and system includes both the object creation environment and the method of object utilization. In one embodiment, the client requests and stores an interface object from a server and establishes an interface object by storing object methods and object properties within the interface object by utilizing a programming interface. The user selects a peripheral device from a collection of devices; the client then request; the server to create a peripheral object corresponding to the selected peripheral device. The peripheral object is created and stored within the client. Communication between the client and the peripheral device is established by implementing the created object's methods and properties. The system establishes and utilizes the interface and/or peripheral objects by employing data processing means for manipulation of data; peripheral module means for storing a plurality of data tables for use by the data processing means; input means for inputting data to the system; and, output means for outputting data from the system.

26 Claims, 16 Drawing Sheets

METHOD AND SYSTEM FOR ESTABLISHING A STANDARD PERIPHERAL INTERFACE SERVER BETWEEN A CLIENT AND A PLURALITY OF PERIPHERALS

This application is a continuation of application Ser. No. 09/153,776 filed Sep. 15, 1995, now U.S. Pat. No. 6,282, 590, which is hereby incorporated by reference.

BACKGROUND OF THE INVENTION

Mail piece production and shipping systems are examples of data processing systems whose purpose is to utilize a variety of peripheral devices to produce data which may be further implemented in a variety of applications such as for example a carrier manifest. These systems typically include an application or client communicating with a peripheral device, such as, for example, a scale or a meter. Such peripheral devices are well known in the art.

In typical use these systems determine the weight of a mail piece or the amount of postage required for the mail piece. The mail piece data obtained from such application may then be utilized in further applications such as tripping a mail machine, carrier management, or other desired mailing systems. Such mail piece production systems and shipping systems are known in the art and have developed with changes in postal regulations (such as those of the United States Postal Service, or USPS) and with proliferation of appropriate software applications. In turn, this production has served the need to automate and accelerate to accommodate growth.

These prior systems, however, do not have the capability of providing a standard interface for communicating between a variety of applications and a plurality of peripheral devices. Nor do these systems have the capability of sharing peripheral devices between multiple applications running on the same personal computer. As well, these prior systems do not provide a common interface for all peripheral devices. As user interest in customization of mailing systems applications has increased, so to has the need to provide an effective, efficient and inexpensive solution for communicating between a client and a variety of peripheral devices.

As the capabilities of data processing systems have grown, so to have the requirements that are tasked to these systems. Greater speed in these systems has given rise to more detailed-oriented applications, greater memory capability has made memory intensive applications more attractive, and detailed applications have lead to more wide spread use of previously inaccessible data processing abilities. With the spiraling growth in data processing ability, there has grown a need for more efficient, ways of programming that promote speed as well as flexibility. Flexibility, in particular, allows applications that have been designed in varied programming languages, or operating on different platforms to be able to communicate without extensive systems or file modification.

One such means of promoting flexibility within a data processing system is the use of "object-oriented" design (OOD). Object oriented programming languages are useful in removing some of the restrictions that have hampered application design due to the inflexibility of traditional programming languages.

OOD utilizes a basic element or construct known as the "object," which combines both a data structure and an intended behavior characteristic within the single element. Objects are bundles of data and the procedures which best identify the use of that data. Objects can be specific or conceptual and are often used to represent models of real-world object groupings; this has the effect of helping software applications become an organized collection of discrete objects in which data is held or moved based on the intended behavior of an object which is inherently unique. Each object knows how to perform some activity.

The objects interact and communicate with each other via messages. A message is initiated by one object for the purpose of getting a second message to perform an act such as performing the steps of a method. Information parameters may be passed along with the message so that the receiving object will have guidelines for performing its action.

Software objects share two characteristics; they all have "state" and "behavior." The State is the condition of the object expressed in variables or properties (what it knows), while behavior is implemented by performance of a method (what it can do). Packaging the object's variables, together with its methods is called "encapsulation or storing." Encapsulation is used to hide unimportant implementation details from other objects; and, this in turn provides two primary benefits to software developers. These benefits are: (1) modularity and (2) information hiding.

Modularity of objects means that the source code for an object can be written and maintained independently of the source code for other objects, thus allowing a certain autonomy of purpose for each individual object. Information hiding, on the other hand, is the ability to keep private certain of its data and methods without effecting the other objects which may depend upon it. Common dependencies among objects can maintain communication by utilizing a public interface for information sharing.

Objects interact and communicate with each other through the use of messages. Each message has three components that are necessary for receiving object to be able to perform a desired method; these are: 1) the object to whom the message is addressed; 2) the name of the method that is to be performed; and 3) the method required parameters. Because these three components alone represent what is required for methods to be activated, it is not required that objects be located within the same process in order for communication to take place. Message use, therefore, is the supporting means for object interaction. But to be of value to a particular application, objects must be able to be referenced.

Referencing is accomplished through indexing, addressing or through value assignment which can be placed in a table for use as required. Objects can also be arranged by classification. Classification is based on groupings of objects based upon properties or characteristics important to an application or requirement. Each class describes a potentially infinite set of objects that comprise the class. Object interaction can be further optimized by the use of class distinction. Classes are organizational blueprints that define the variables and methods which are common to all objects of a particular group. Values for each of the variables are assigned and allocated to memory when an assistance from a class is created. Additionally, methods can only be performed when a class instance has been allocated to memory. Thus, the most distinct advantage of class use is the ability to reuse the classes and thus further create more objects. Classes in turn can be subdivided into subclasses which inherit the state of the underlying class. the further advantage being the ability to create specialized implementations of methods.

The constant growth an expansion of software system and the hardware platforms that support them has led to the emergence of object oriented programming which reduces time and memory capacity requirements by taking advantage of certain redundancies by treating them as unique software objects.

The advantages of objects lie in the ability of objects to link performance characteristics. The linking of objects to applications is done through object linking and embedding techniques known by the acronym "OLE." This greatly optimizes the using system's ability to find data and use it effectively. Systems that utilize formats whose structure and requirements repeat, would benefit greatly from object oriented techniques. And, if the system were to be able to define its principle data requirements in the form of objects, it would inherit the advantages of he object oriented environment while maintaining the inherent systems advantages.

OOD is known in the software arts and specific discussion of application design based upon OOD is not required for a thorough understanding of the applicant's claimed invention. It is, however, one object of the present claimed invention to disclose a method and system for utilizing object oriented design for effectively and efficiently linking applications within a data production system.

The mailing systems art specifically shipping systems and carrier management systems can clearly benefit from a method that captures the peripheral device parameters and employs those methods within a system that provides a single interface server for communicating between applications and a variety of peripheral devices. Therefore it is an object of the present invention to provide a standard interface to a variety of scales and meters for use in any application. It is also an object of this invention to provide a standard interface for all types of scales and meters. It is a further object of this invention to relieve the application of the responsibility of supporting new scales and meters as they are developed. Yet another object of this invention is to allow sharing of peripheral devices between multiple applications running on the same personal computer.

SUMMARY OF INVENTION

The limitations of the prior art are overcome by a method for creating an interface in an object oriented development environment of a data processing system for embedding within one or more software applications.

The present claimed invention is a method and system of providing interactive standard set of visual basic and C++Active x interfaces between a scales and postage meter peripherals for use in any application. The invention manages the scales and postal meters peripherals attached to a personal computer for a shipping or similar applications. The interface provides a scale independent application level interface to a scale or platform. Though use of the interface requirements of the present invention applications have the ability to communicate with a variety of scales without regard to scale specifics. This requires that all data values, formats and sequence of events must be normalized across all scale types and models.

Active X is a set of integration technologies that enable software components to inter-operate in a networked environment using any programming language. Active X controls are individual components that have a specific function (displaying a list box, displaying a command button, waiting a certain number of seconds, etc.) that when used together can create navigation tool and complete on-line applications. Active X controls are used throughout Microsoft Windows applications and are typically called an OCX file. AcitveX provides support from a wide range of tools including Microsoft Visual Basic. Visual Basic is known in the art, a detailed description of Visual Basic is not necessary for an understanding of this invention.

The ActiveX components must run under Microsoft Windows 32 bit operating systems, such as for example, WINDOWS 95 NT 4.0, WIDOWS 98, WINDOWS NT 5.0 developed by MICROSOFT Corp.

The scales or meter server consists of several main components. The main server executable, the multiple loadable scale driver dynamics link libraries (dll's), and the registration database entries. The system server may also include a Scale OCX, and a Scale Utility.

The method and system of the present invention provides a standard interface between a client and a plurality of peripheral devices. In one embodiment, the interface can be established by creating an interface object and a peripheral object in an object oriented development environment of a data processing system. The method and system includes both the object creation environment and the method of object utilization. The client requests and stores an interface object from a server and establishes an interface object by storing object methods and object properties within the interface object by utilizing a programming interface. The user then selects either a scale or meter peripheral device from a collection of devices, the client then request the server to create an object corresponding to the selected peripheral device. A peripheral object is created and stored within the client. Communication between the client and the peripheral device is established by implementing the created objects methods and properties.

In another embodiment the client creates a peripheral interface object which includes both the scale and meter interface included with are the methods and properties. The user selects a peripheral device from a plurality of peripheral devices. The client requests a peripheral interface object from a server and establishes a peripheral interface object corresponding to said selected peripheral device. The peripheral interface object is created by storing object methods within the peripheral interface object by utilizing a programming interface and by storing object properties within the peripheral interface object by utilizing the programming interface. The peripheral interface object is then stored within the client. The properties and methods are then utilizing said peripheral interface object to communicate between said client and said selected peripheral device under the direction of said client.

The server of the present invention further includes a peripheral module. The peripheral module comprises a set of data tables that may include gravity compensation tables and error code determining tables. The gravity compensation tables may comprise a zip code directory, an area code directory, a grid directory or some other means of determining gravity compensation for a given point in space.

The interface object of the present invention may also establish a human interface for allowing data to be displayed to a system operator under direction from said object methods. The human interface may be a monitor, a printer or the like. The peripheral device may be a scale, a meter or the like.

DETAILED DESCRIPTION OF THE PREFERRED EMBODIMENTS

Figure 1:
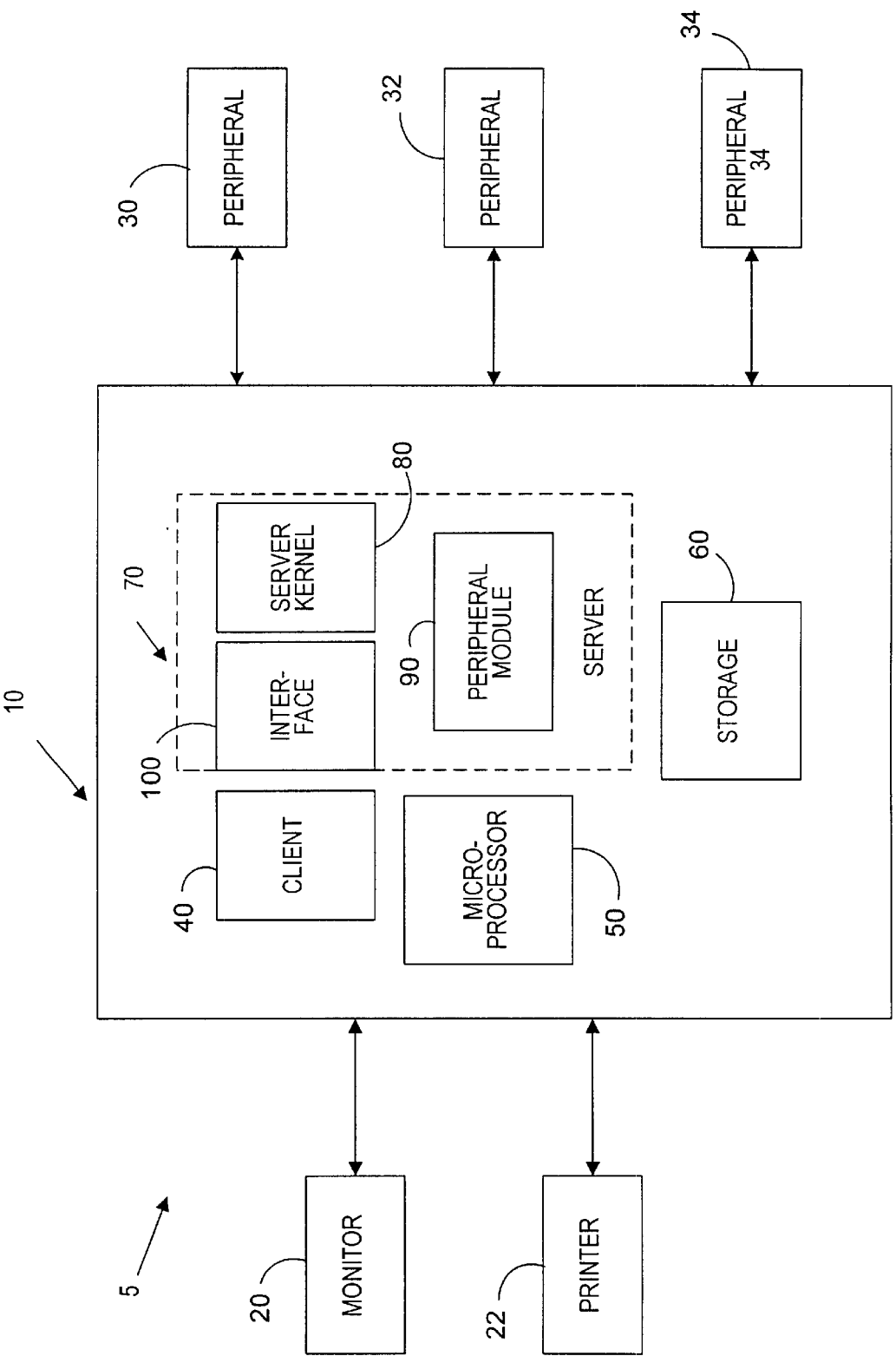
FIG. 1 is a block diagram of a typical system within which the method of the present invention could reside and be utilized.

Turning to FIG. 1 there is shown a block diagram of a typical system 5 within which the method of the present invention could reside and be utilized.

System 5 comprises a computer 10 inter-operatively connected to monitor 20 for viewing applications. The viewing of applications on a display means such as a monitor 20 promotes ease of use in word and data processing. Printer 22 is inter-operatively connected to computer 10 and serves as an output means by which the application may be printed. Monitor 20 and printer 22 provide examples of a human interfaces that could be brought to system 5 by the methods proposed herein. Computer 10 is also inter-operatively connected to peripheral devices 30, 32, and 34. Peripheral devices 32, 34, and 36 may be a variety of scales and/or meters. It should be noted that system 5 as shown may be expanded upon in several ways to produce mail pieces more effectively, with greater throughput, or with more detail.

Computer 10 further includes a microprocessor 50 enabling communication between client 40, server 70 and storage 60.

Server 70 provides the Active X interface for the client applications, configures and maintains the configuration and loads the appropriate drivers dynamic link libraries. In typical operation server 70 is only invoked through automation. Server 70 further includes peripheral module 90 and interface 100 communicating through server kernel 80. The scale server kernel 80 is responsible the interface storing the configuration.

Peripheral module 90 is responsible for all low level communication between the server and the peripheral. Peripheral module 90 includes the code and data, as well as, persistence information required by the server including multiple loadable scale drivers dynamic link libraries. The loadable dll's are implemented as drives for the particular peripheral selected by the user. Based upon the user's selection of peripherals the appropriate dll's are loaded and executed based on the types of peripherals configured. This design allows easy addition of support for peripherals that may be added, without effecting the application. The peripheral module 90 also includes self-registering dll's which communicate between the server 70 and the peripheral device 30, 32 and 34.

Server Kernel 80 manages storage of the current scales and meters that are configured on the computer, as well as, a list of all available scales and meters that can be installed on to the computers, consisting of the appropriate dll's to be present.

Figure 2:
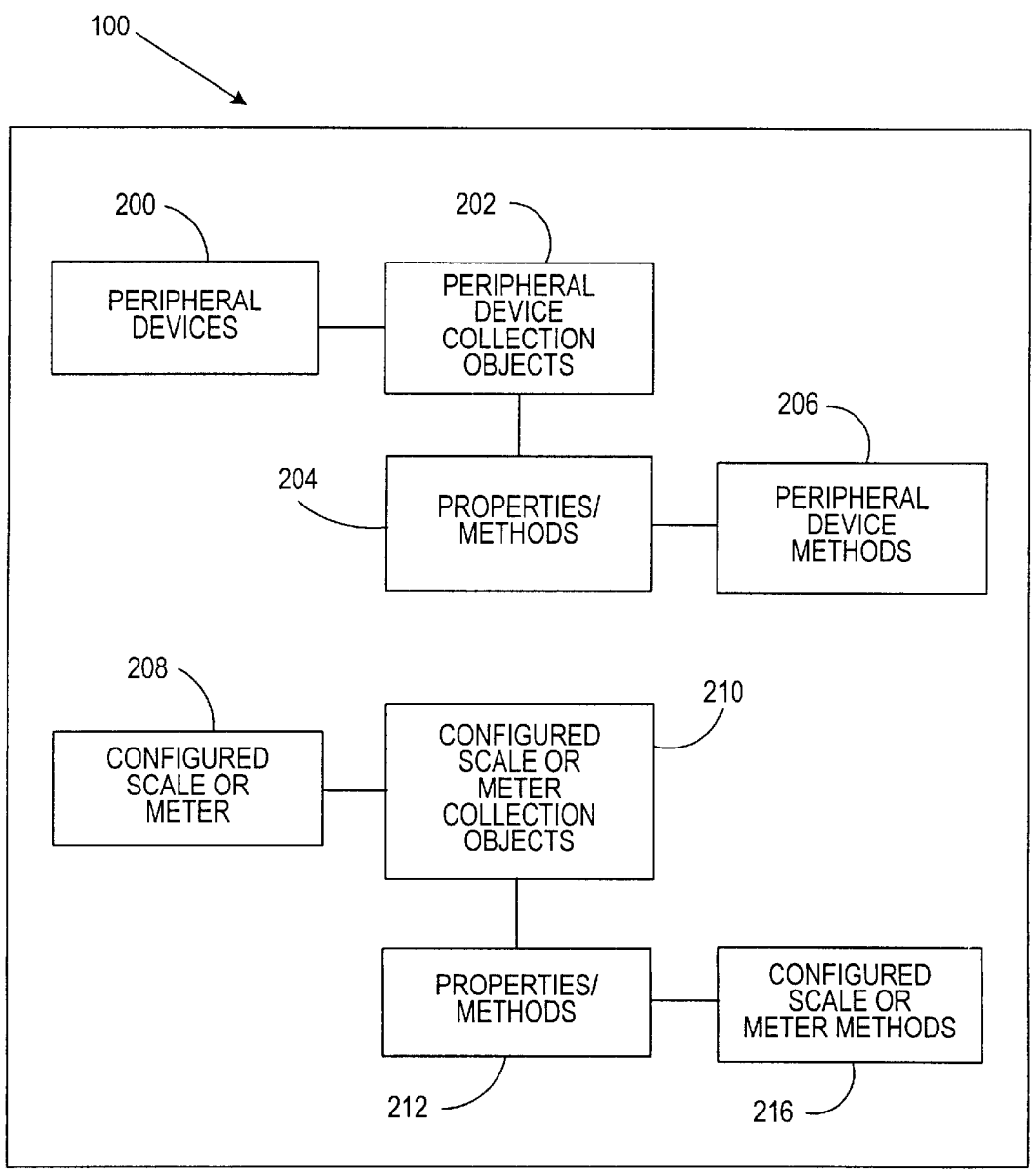
FIG. 2 is a block diagram of a first embodiment of an interface of the present invention.

Now turning to FIG. 2 there is shown a block diagram of the first embodiment of interface 100. Interface 100 includes a plurality of peripheral interfaces each containing both a peripheral devices property 200 and a configured peripheral property 208.

The peripheral device property 200 includes collection objects 202 for the peripheral device manufacturers and models that are supported by server 70. Each device member of the collection is a device object. Each peripheral device collection object 202 has properties 204. Included in properties 204 are count, item, and enumerate (not shown). The count property represents the number of scales or meters supported by the server. The item property returns the device object specified by either a numerical index. The enumerate property is used to support a collection the for each construct which is commonly known it the art.

Within the item property exists the device objects which includes HelpFile Property, Manufacturer Property, Model Property, Ports Property, Version Property, and the Configure method.

The HelpFile Property provides the name and path to a windows help file with information about the particular scale. The Manufacturer Property provides the name of the scale manufacturer. The Model Property provides the method name of the scale model. The Ports Property provides a reference to a collection of ports objects. The Version Property provides the version of the scale driver. The Configure method is configures the current scale diver as being attached to the system. The Configure method must specify a name for the scale or meter and the port where the scale or meter is to be attached. This will cause the scale or meter to be added to the appropriate collection i.e. scales or meters collection.

The configured scales property 208 includes the collection objects 210 that are currently installed and configured for the system. Each member of the collection is a scale object. Each configured scales collection objects 210 has properties 212 including count, enumerate an item as described above. The scales collection object 210 also includes a remove method that allows the user to remove a scale device from the system.

Within the item property further exists configured scale object 216. The scale object includes the properties Description, HelpFile, Name, PortDescription, State, StateStatusDescription, UnitKilograms, UnitPounds, Version, and Weight. The scale methods 216 for the scale peripherals include CalibrateWeight, CalibrateGravity, Get Weight and Zero.

The Description property provides a textual description of the manufacturer and model of the attached scale.

The HelpFile property provides a path and file name of a Windows help file that describes the specific scale.

The Name property provides the name given to the scale when it was installed and configured on the system. Each scale is given a unique name. The port description property provides a textual description of the port to which the scale is attached.

The State property provides the state of the scale represented by status codes.

The StateStatusDescription property provides a translation between the numerical state and status codes returned by the scale server and peripheral objects and a textual description.

The UnitKilograms property provides a constant value definition for the units parameter of the get weight method described herein below. This constant is selected if the user wishes the weight value to be returned in kilograms.

The UnitPound property also provides a constant value definition for the units parameter of the get weight method described herein below. This constant is selected if the user wishes the weight value to be returned in pounds. The version property provides a string with both the version of the ActiveX scale driver and the version string from the scale if applicable.

The Weight property provides the last weight read from the scale in the unit of the last weight requested.

The CalibrateGravity method calibrates the scale using a location code to adjust the scale based on the local gravity. The CalibrateWeight method will perform scale calibration using a set of weights being placed on the scale. The method is initially called with step being set to a 1 with no weight on the scale. When the method returns "weight" and "units" will be set to the weight needed for the scale calibration point and "step" will have been incremented. After the correct weight has been placed on the scale the method should be called again with the new "step" value and the "weight" and "units" value. The method will return with a new "step" and "weight" values. The user places the new weight on the platform and calls again. This process will continue until the method returns with step set to value zero. At that point the application must call the method CalibrateWeightComplete to either save or cancel the calibration. The application may cancel the calibration procedure at any time calling the method with "step" set to a −1. In that case, calibrate weight complete would not need to be called. The GetWeight method will obtain the current weight on the scale in the unit of measure requested. The Zero scale method attempts to zero the scale at a zero weight.

The configured meters property 208 includes the collection objects 210 that are currently installed and configured for the system. Each member of the collection is a meter object. Each configured meters collection objects 210 has properties 212 including count, enumerate an item as described above. The meters collection object 210 also includes a remove method that allows the user to remove a meter device from the system.

Within the item property further exists configured meter object 216. The meter object includes the properties Ascending, BatchCount, BachValue, ControlSum, Descending, Discrepency, HelpFile, LockFunds, PCN, PieceCount, Postage, SerialNumber, Status, Version. The configured meter object methods include GetAscending, BeginBatch, EndBatch, GetControlSum, GetDescending, Offline, Online, Reconsile, Refresh, Set, SetTrip, GetSerialNmber, Getstatus, Trip.

The Ascending property provides the value of the ascending register. This is the value of the local copy within the computer, this value is synched with the meter at various times. The ascending register is a constantly increasing number within the meter representative of the total postage used by the meter.

The BatchCount property provides the number of units (or pieces of mail) that have been processed in the current batch or were processed in the last batch. This property can be read during batch processing to get the current count. The BatchCount property will also retain the value after the batch is complete until the next BeginBach method is called.

The BachValue property provides the amount of postage used in the current batch or the amount of postage that was used in the last batch. This property can be read during batch processing to get the current postage used value. The batch value will also be retained after the batch is finished, until the next BeginBatch method is called.

The ControlSum property provides the sum of the ascending and descending registers.

The Descending property provides the value of the descending register. This is the value of the local copy within the computer. The value is synchronized with the meter at various times. The descending register is a count of the amount of available postage in the meter.

The Discrepancy property provides the amount of postage that was trippd external to the control of the client or the amount of money that was added to the meter.

The HelpFile property provides the file name and path of a help file giving help about the particular meter.

The LockFunds property provides a flag if the meter object should lock or stop the funds and provides a check for meter discrepancies for new meters or before a new meter operation. If the method receives a true response is obtained LockFunds checks for meter fund discrepancies. If the method receives a false response is returned the check does not occur however, the meter still trips. Tripping of a meter is commonly known in the art, thus a detailed description of its operation is not necessary for an understanding of this invention.

The PCN property provides the product control number for the meter. The PieceCount property provides the total number of mail pieces hat have been processed during the life of the meter.

The Postage property provides the amount of postage the meter is currently set to trip.

The SerialNumber, property provides the serial number of the meter. This value is the current value stored on the computer.

The Status, property provides the last known status value from the meter.

The Version property provides a string with both the version of the ActiveX meter driver and the version string from the meter.

The GetAscending method queries the current ascending register value from the meter. The difference between the GetAscending method and the property is that the method obtains the value from the meter were as the property returns the value in the computer.

The BeginBatch method starts batch processing on the meter which sets the postage, unlocks, and enables the meter. The EndBatch method ends batch processing on the meter and sets the final batch value count and count properties, locks and disables the keyboard if in online mode.

The GetControlSum method queries the current control sum from the meter. The control sum is the sum of the ascending and descending registers. The difference between the GetControlSum method and property is that the method actually get the value from the meter were as the property returns the value in the computer.

The GetDescending method queries the current descending register value from the meter. The difference between the GetDescending method and property is that the method actually obtains the value from the meter were as the property returns the value in the computer.

The Offline method sets up the meter for offline (or manual) transactions it also unlocks the meter keyboard and enables manual meter tripping by the user. The Online method sets up the meter for online (or computer controlled) transactions and locks the keyboard and disables manual tripping by the user.

The Reconcile method is used to clear status and accept as correct the following type of events, Discrepancies (meter funds spent off-line), AddFunds (money added to the meter vault), New Meter (indicating a changed meter head). New register values will be taken from the meter and stored in the computer.

The Refresh method queries the meter to update the values of all properties. The Set method sets the postage on the meter. The SetTrip method sets the postage and trips the meter. The GetSerialNmber method queries the current serial number of the meter. The difference between the GetSerialNmber method and property is that the method actually obtains the value from the meter were as the property return the value in the computer.

The GetStatus method queries the current status of the meter. The difference between the GetStatus method and the property is that the method actually obtains the value from the meter where as the property returns the value in the computer. The Trip method trips the meter with the currently sets postage value.

Figure 3:
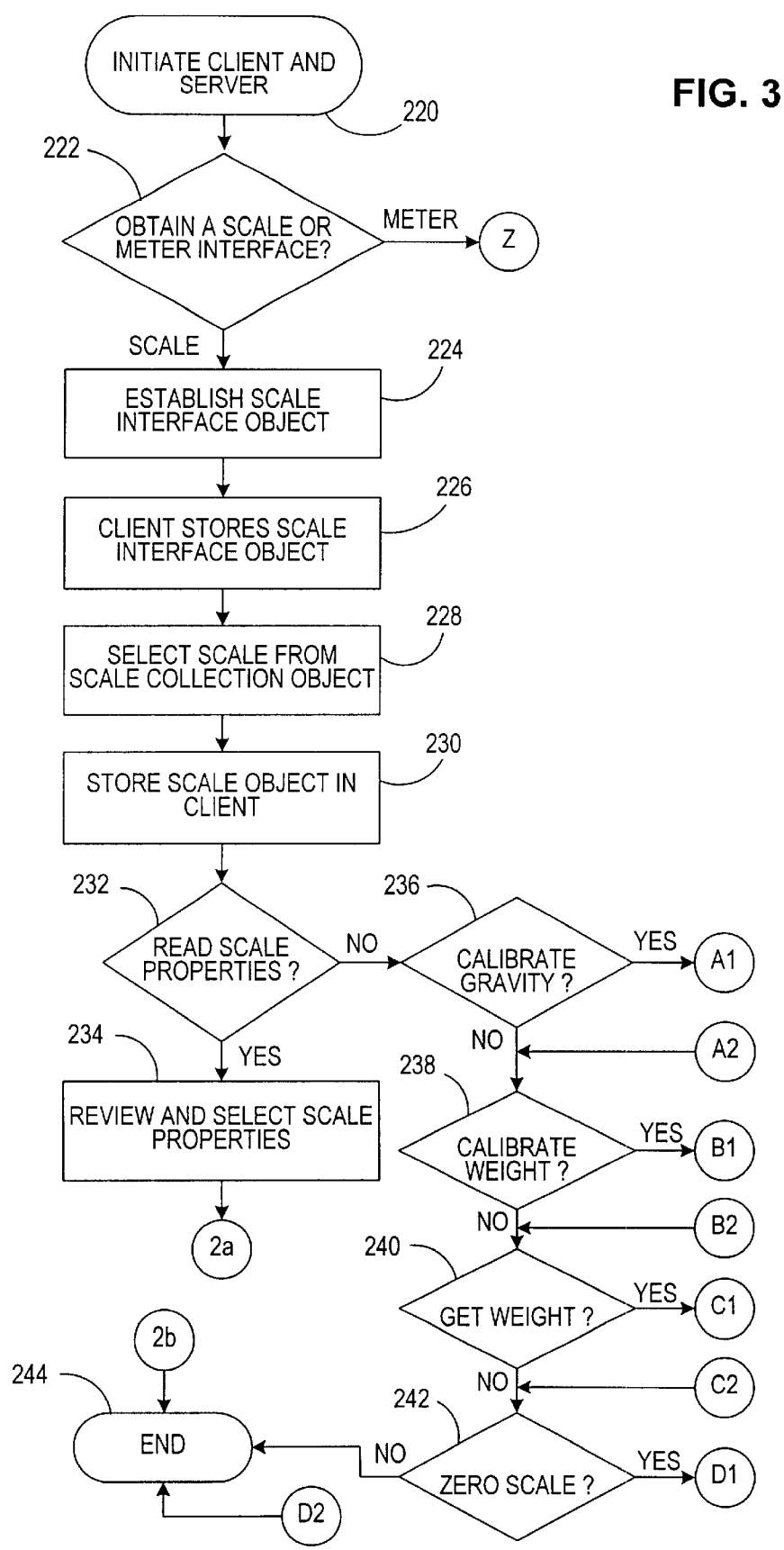
FIG. 3 is an upper level flowchart of the method of creating and utilizing a scale interface of the present invention.

Now turning to FIG. 3, there is shown a flowchart of the method utilized to create interface 100. The creation of interface 100 begins at step 220 where a system user initiates a client and a server. from step 220, the method advances to step 222 where the method inquires whether the peripheral device 30, 32, or 34 is a scale. If the answer to the query is no then the method advances to path Z.

If the answer to the query is yes than the method advances to step 224 where the method establishes a scale interface object. From step 224 the method advances to step 226 where the client stores the scale interface object. From step 226 the method advances to step 228 where the user selects a scale from the scale collection object 210. The method then advances from step 228 to step 230 where the scale object is stored in the client.

From step 230 the method advances to step 232 where the method inquires whether the user would like to read the scale properties. If the answer to the inquiry is yes the method advances to path 2a. If the answer to the query is no then the method advances to step 236 where the method inquires if the user would like to calibrate gravity. If the response to the query is yes then the method continues to path A1. If the response to the query is no the method continues to step 238 which inquires whether the user desires to calibrate the weight. If the answer to the query is yes then the method continues to path B1.

If the response to the query is no then the method advances to step 240 where the method inquires if the user would like to get weight. If the response to the query is yes then the method continues to path c1. If the response to the query is no the method continues to step 424 which inquires whether the user desires to zero the scale. If the answer to the query is yes then the method continues to path D1. If the response to the query is no then the method advances to end, at step 244. It should be noted that steps 236 through 242 may be performed in any order.

Figure 4:
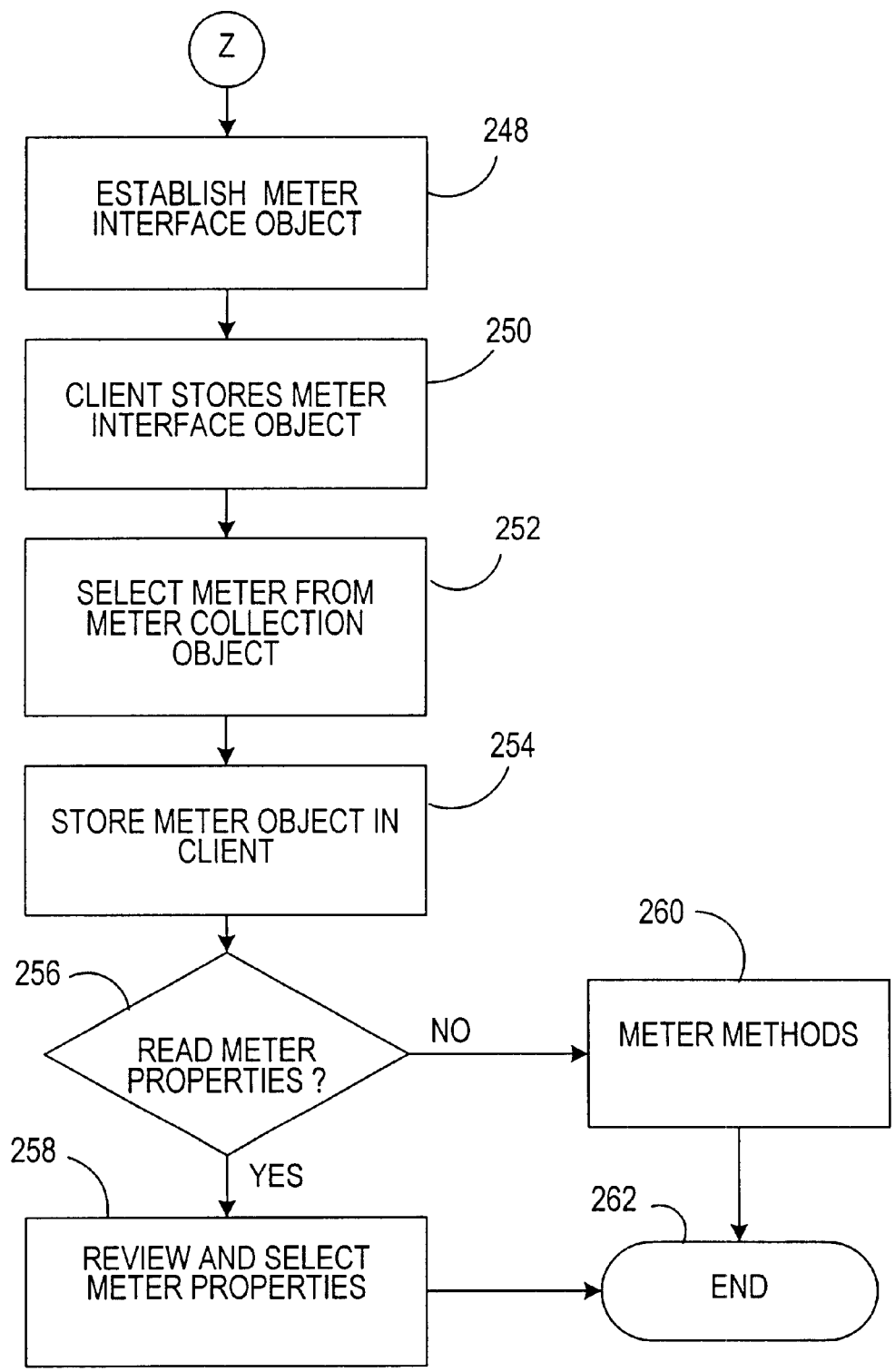
FIG. 4 is an upper level flowchart of the method of creating and utilizing the meter interface of the present invention.

Turning now to FIG. 4, there is shown a flowchart of the method as it continues down path Z to step 248 where a meter interface object is established. The method then continues to step 250 where the meter interface is stored in the client. The method then continues to step 252 where the user selects a meter from the meter collection object. The method then advances to step 254 where the meter object is stored in the client. The method the advances to step 256 where the method inquires the user if they would like to read the meter properties. If the response to the query is no the method advances to step 260 where the user may implement a the meter of methods described herein above, in a similar manner as the scale methods were implemented.

After the user has completed the application of the meter methods the method advances to end at step 262. However, if the response to query 256 is yes then the user may review and select a variety of meter properties described herein above in a similar manner as the scale properties are reviewed and selected (See FIG. 5). After the user has reviewed the desired properties the method advances to end at step 262.

Figure 5:
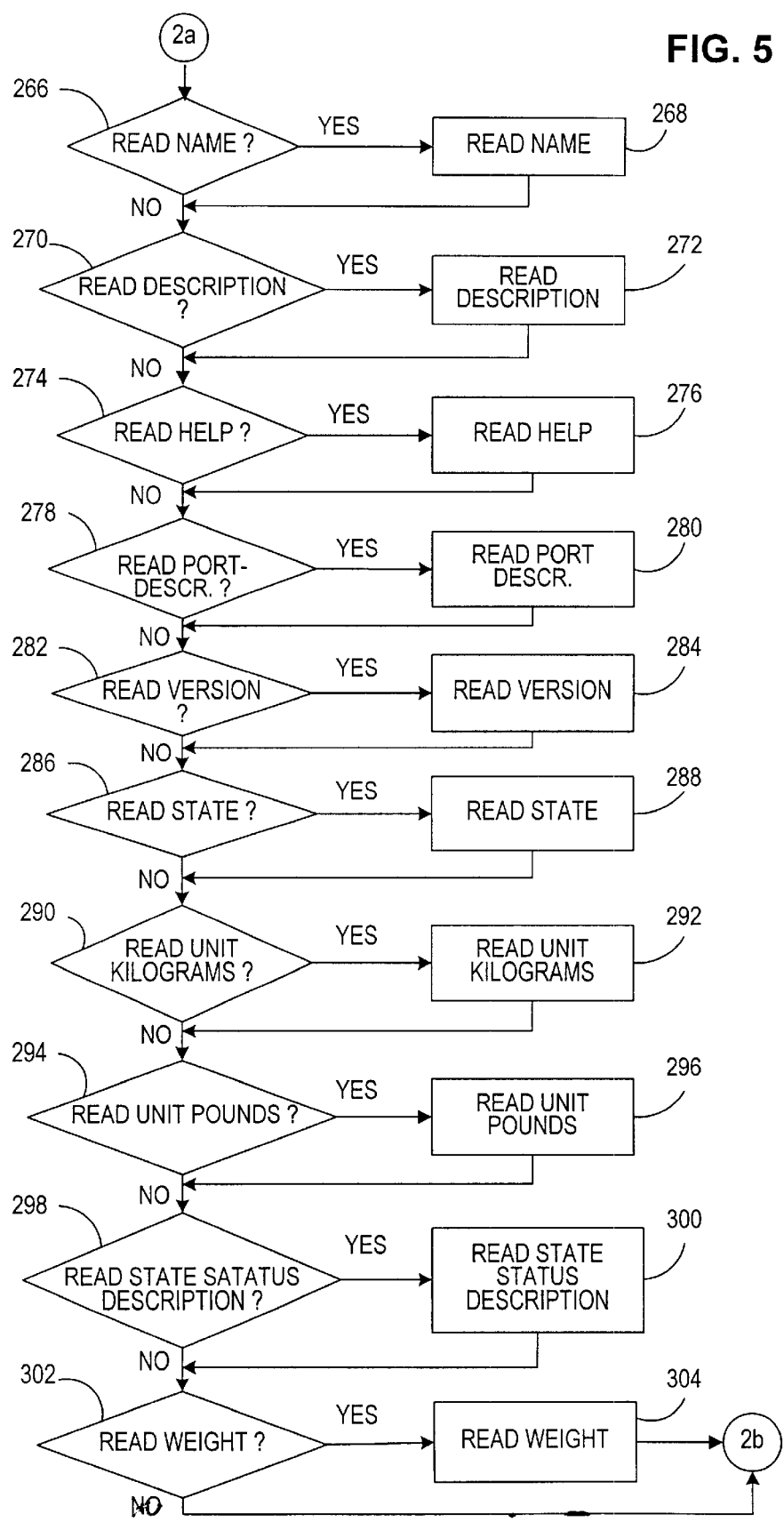
FIG. 5 is a flowchart of the scale properties of the present invention.

Now turning to FIG. 5, there is shown a flowchart of the method as it continues to path 2a and advances to step 266 where the method inquires it the user would like to read the name of the peripheral. If the answer to the inquiry is yes then method advances to step 268 where the user reads the peripheral name. If the answer to the query is no then the method advances to step 270 where the method inquires if the user wishes to read the description property. If the answer to the inquiry is yes then the method advances to step 272 where the user reads the description. If the answer to the inquiry is no the method advances to step 274 where the method inquires if the user wishes to read the help property.

If the answer to the inquiry is yes at step 274 then the method advances to step 276 where the user reads the help property. If the answer to the inquiry is no the method advances to step 278 where the method inquires if the user wishes to read the port property. If the answer to the inquiry is yes then the method advances to step 280 where the user reads the port description property. If the answer to the inquiry is no the method advances to step 282 where the method inquires if the user wishes to read the version property. If the answer to the inquiry is yes then the method advances to step 284 where the user reads the version property. If the answer to the inquiry is no the method advances to step 286 where the method inquires if the user wishes to read the state property. If the answer to the inquiry is yes then the method advances to step 288 where the user reads the state property. If the answer to the inquiry is no the method advances to step 290 where the method inquires if the user wishes to read the unit kilogram property.

If the answer to the inquiry is yes at step 290 then the method advances to step 292 where the user reads the unit kilograms property. If the answer to the inquiry is no the method advances to step 294 where the method inquires if the user wishes to read the unit pounds property. If the answer to the inquiry is yes then the method advances to step 296 where the user reads the unit pounds property. If the answer to the inquiry is no the method advances to step 298 where the method inquires if the user wishes to read the state status description. If the answer to the inquiry is yes then the method advances to step 300 where the user reads the state status description. If the answer to the inquiry is no the method advances to step 302 where the method inquires if the user wishes to read the weight property. If the answer to the inquiry is yes then the method advances to step 304 where the user reads the weight property. If the answer to the inquiry is no the method continues to path 2b.

Figure 6:
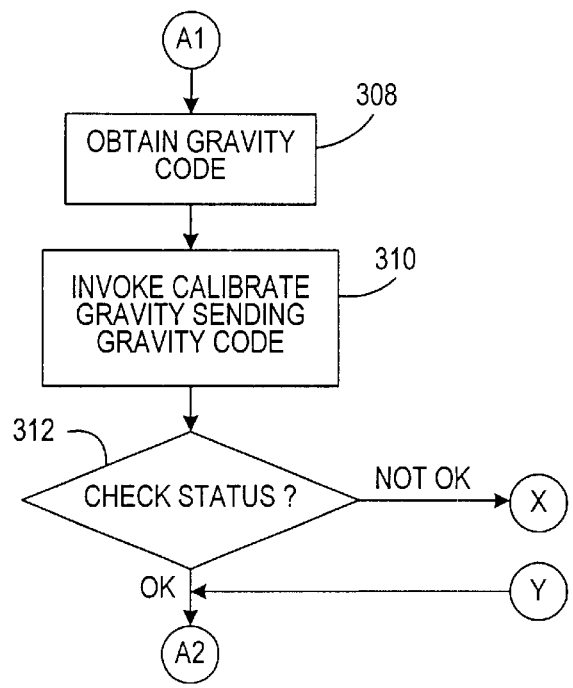
FIG. 6 is a flowchart of scale interface the calibrate gravity method of the present invention.

Now turning to FIG. 6, there is shown a flowchart of the calibrate gravity method. The method continues at path A1 and advances to step 308 where the method obtains a gravity code. The method then advances to step 310 where the method invokes a calibrate gravity and sends the gravity code to the method. The method then advances to step 312 where the method inquires as to the completion status of the method. If the status is "not ok" the method proceeds to path X where error processing is performed. If the status is "ok" the method advances to path A2.

Figure 7:
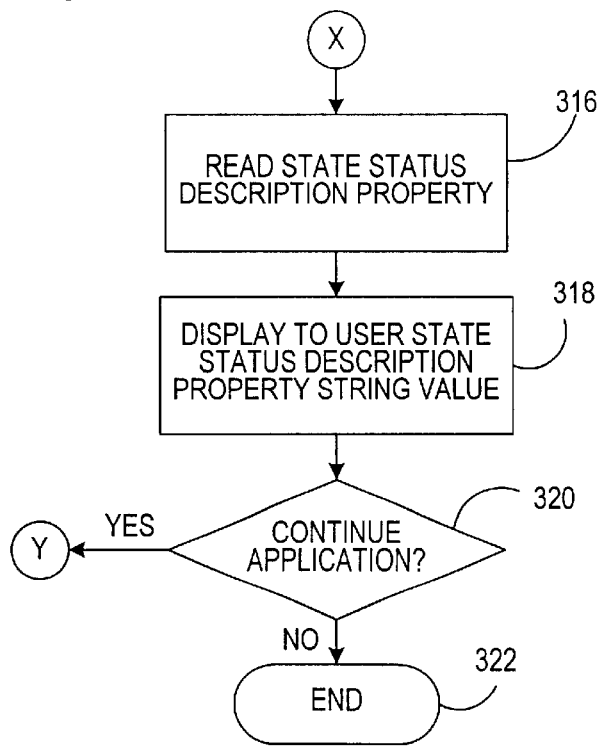
FIG. 7 is a flowchart of the scale interface and meter interface error processing of the present invention.

Now turning to FIG. 7, there is shown a flowchart of the error processing for the first embodiment of the invention. The method continues to path X and advances to step 316 where the state status description property is read. The method then advances to step 318 where the method displays to the user the state status description property string value which is interpreted into readable text. The method then advances to step 320 where the method inquires whether the user wishes to continue the application. If the response to the query is yes the method advances to path Y. If the response to the query is no then the method advances to end at step 322.

Figure 8:
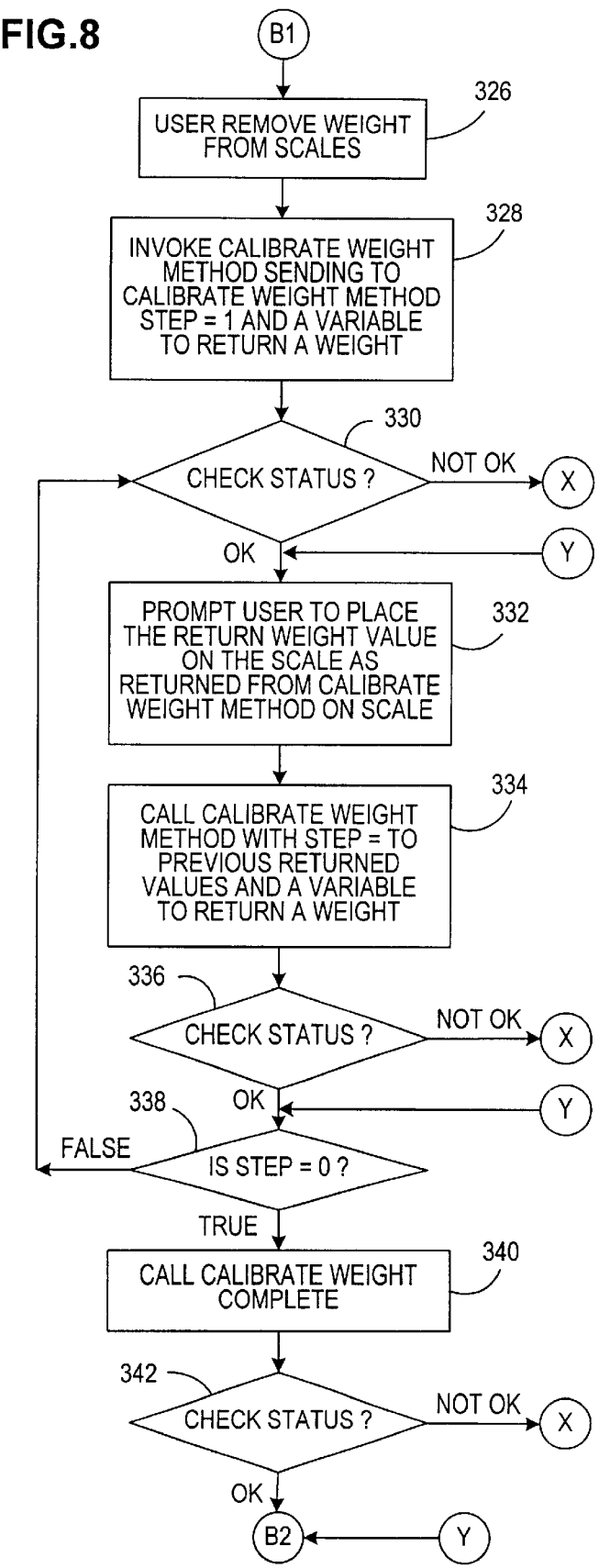
FIG. 8 is a flowchart of the scale interface calibrate weight method of the present invention.

Now turning to FIG. 8 there is shown a flowchart of the calibrate weight method. The method continues to path B1 and advances to step 326 where the user clears the scale of any weight. The method then advances to step 328 where the method invokes the calibrate weight method and sends to the method a step=1 and a variable to return a weight. The method then advances to step 330 where the method inquires the status of the previous calibrate weight method step. If the response to the inquiry is "not ok" the method advances to path X. If the response to the inquiry is "ok" then the method advances to step 332 where the method prompts the user to place the returned weight value, as returned from the calibrate weight method, on the scale.

The method then advances to step 334 where the method calls the calibrate weight method with step=to the previous returned values and a variable to return a weight. The method then advances to step 336 where the method inquires as to the status of the previously executes step 334. If the status is "not ok" the method advances to path X. If the status is "ok" the method advances to step 338 where the method inquires if the step is equal to =0. If the response to the query is "false" the method advances to step 330. If the response to the query is "true" the method advances to step 340 where the method calls the calibrate weight complete. The method then advances to step 342 where the method inquires as to the status of the previous step 340. If the response to the query is "not ok" then the step advances to path X. If the response to the inquiry is "no" the method proceeds to path B2.

Figure 9:
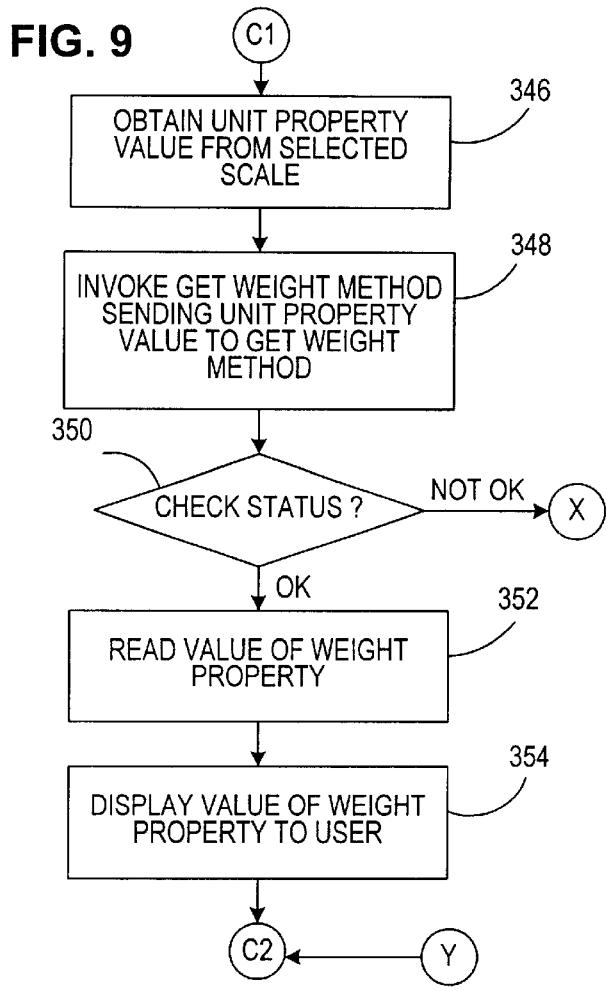
FIG. 9 is a flowchart of the scale interface get weight method of the present invention.

Now turn to FIG. 9 there is shown a flowchart of the get weight method. The method continues at path C1 and advances to step 346 where the method obtains a unit property value from the selected scale. The method then advances to step 348 where the method invokes the get weight method and sends a unit property value to the get weight method. The method the proceeds to step 350 where the method inquires as to the status of the previously executed step 348. If the response the query status is "not ok" then the method proceeds to path X. If the response to the query is "ok" then the method advances to step 352 where the value of the weight property is read. The method then advances to step 354 where the method displays the value of the weight property to the user. The method then advances to path C2.

Figure 10:
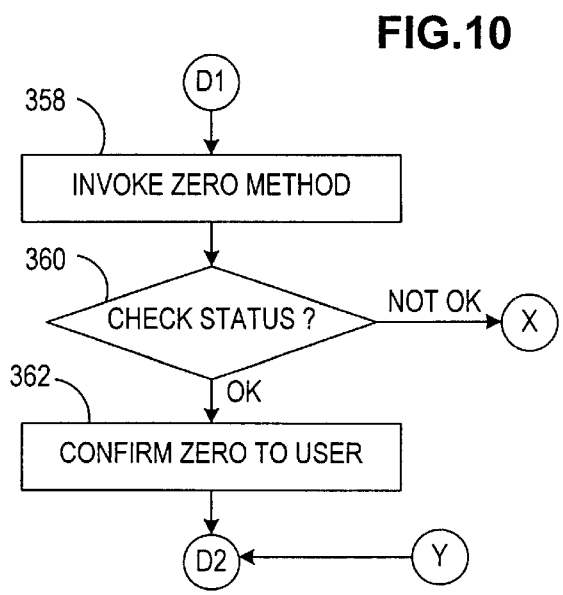
FIG. 10 is a flowchart of the scale interface zero scale method of the present invention.

Now turning to FIG. 10 is a flowchart of the zero scale method. The method advances to path D1 and advances to step 358 where the zero method is invoked the method then advances to step 360 where the method query as to the status of the previously executed step 358. If the status is "not ok" the method advances to path X. If the response to the inquiry is "ok" the method advances to step 362 where the zeroing the scale is confirmed to the user. The method the advances to path D2.

It should be noted that the object methods executed in this embodiment may be performed in any desired order.

Figure 11:
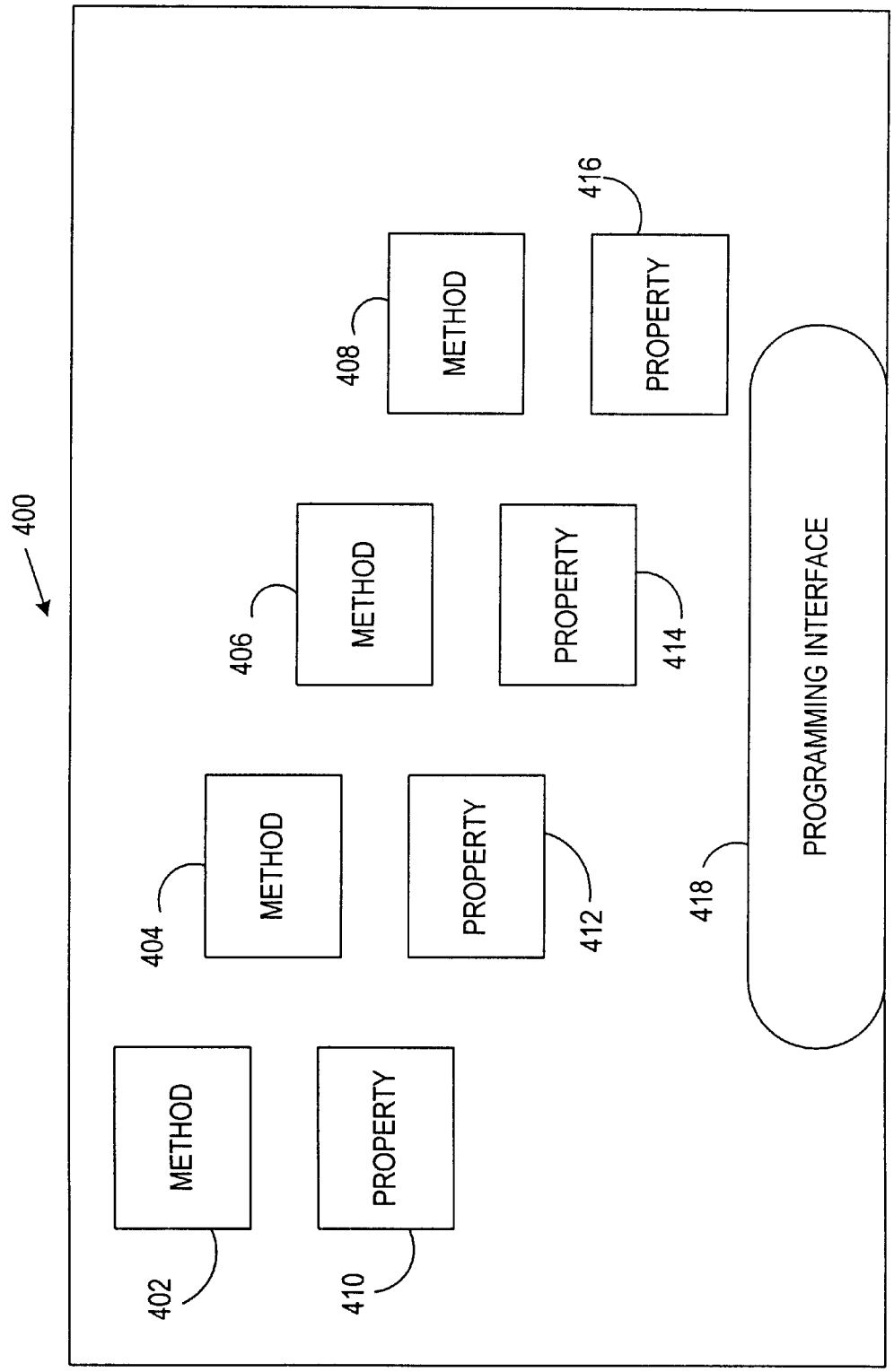
FIG. 11 is a block diagram of a second embodiment of peripheral interface of the present invention.

Now turning to FIG. 11 shown is a block diagram of a second embodiment of the interface of the present invention. The second embodiment of the interface 400 of the present invention includes both a plurality of methods 400–408 and a plurality of properties 410–416 within the peripheral interface and also include a programming interface which enables the interface communication.

Peripheral properties 410–416 include Status, NumScales, ScaleModel, ScalePortDescr, Scale Driver, NumMeters, MeterModel, MeterPortDescr, MeterDriver, NumDevices, DeviceType, DevicesModel, DevicePortDescr, DeviceDriver, ScaleConfig, MeterConfig.

The Status property provides the status of the peripheral.

The NumScales property provides the number of scale currently configured.

The ScaleModel property provides the manufacturer and model of a scale peripheral.

The ScalePortDescr property provides the currently configured port to which the scale is attached.

The ScaleDriver property provides the dll driver file name of the configured scale.

The NumMeters property provides the number of meters currently configured.

The MeterModel property provides the meter manufacturer and model.

The MeterPortDescr property provides the currently configured meter port.

The MeterDriver property provides the meter dll driver file name.

The NumDevices property provides the number of entries in the available device list. the available device list is a list of all the peripherals and ports that are available to be configured.

The DeviceType property provides the type of device in the available device list.

The DevicesModel property provides the manufacturer and model as a string for devices in the available device list.

The DevicePortDescr property provides the communication port for the devices in the available device list.

The DeviceDriver property provides the dll file for the devices in the available device list.

The ScaleConfig method will configure and make available for use the selected scale device.

The MeterConfig property provides the configuration for the meter to be a specific entry from the available device list for use by the selected scale device.

Peripheral methods 402–408 include CalibrateWeight, CalibrateGravity, Get ImperialWeight, GetMetricWeight, Zero, Ascending, BeginBatch, EndBatch, Descending, Offline, Online, Reconsile, SetTrip, Status.

The CalibrateWeight method calibrates the scale using a location code to adjust the scale based on the local gravity. The CalibrateWeight method will perform scale calibration using a set of weights being placed on the scale. The method is initially called with step being set to a 1 with no weight on the scale. When the method returns "weight" and "units" will be set to the weight needed for the scale calibration point and "step" will have been incremented. After the correct weight has been placed on the scale the method should be called again with the new "step" value and the "weight" and "units" value. The method will return with a new "step" and "weight" values. The user places the new weight on the platform and calls again. This process will continue until the method returns with step set to value zero. At that point the application must call the method CalibrateWeightComplete to either save or cancel the calibration. The application may cancel the calibration procedure at any time calling the method with "step" set to a −1. In that case, calibrate weight complete would not need to be called. The GetImperialWeight method will obtain the current weight on the scale in imperial unit. The GetMetricWeight method will obtain the weight on the scale in metric units. The Zero scale method attempts to zero the scale at a zero weight.

The Ascending method queries the current ascending register value from the meter. The BeginBatch method starts batch processing on the meter which sets the postage, unlocks, and enables the meter. The EndBatch method ends batch processing on the meter and sets the final batch value count and count properties, locks and disables the keyboard if in online mode.

The Descending method queries the current descending register value from the meter.

The Offline method sets up the meter for offline (or manual) transactions it also unlocks the meter keyboard and enables manual meter tripping by the user. The Online method sets up the meter for online (or computer controlled) transactions and locks the keyboard and disables manual tripping by the user.

The Reconcile method is used to clear status and accept as correct the following type of events, Discrepancies (meter funds spent off-line), AddFunds (money added to the meter vault), New Matter (indicating a changed meter head). New register values will be taken from the meter and stored in the computer.

The SetTrip method sets the postage and trips the meter. The Status method queries the current status of the meter.

Figure 12:
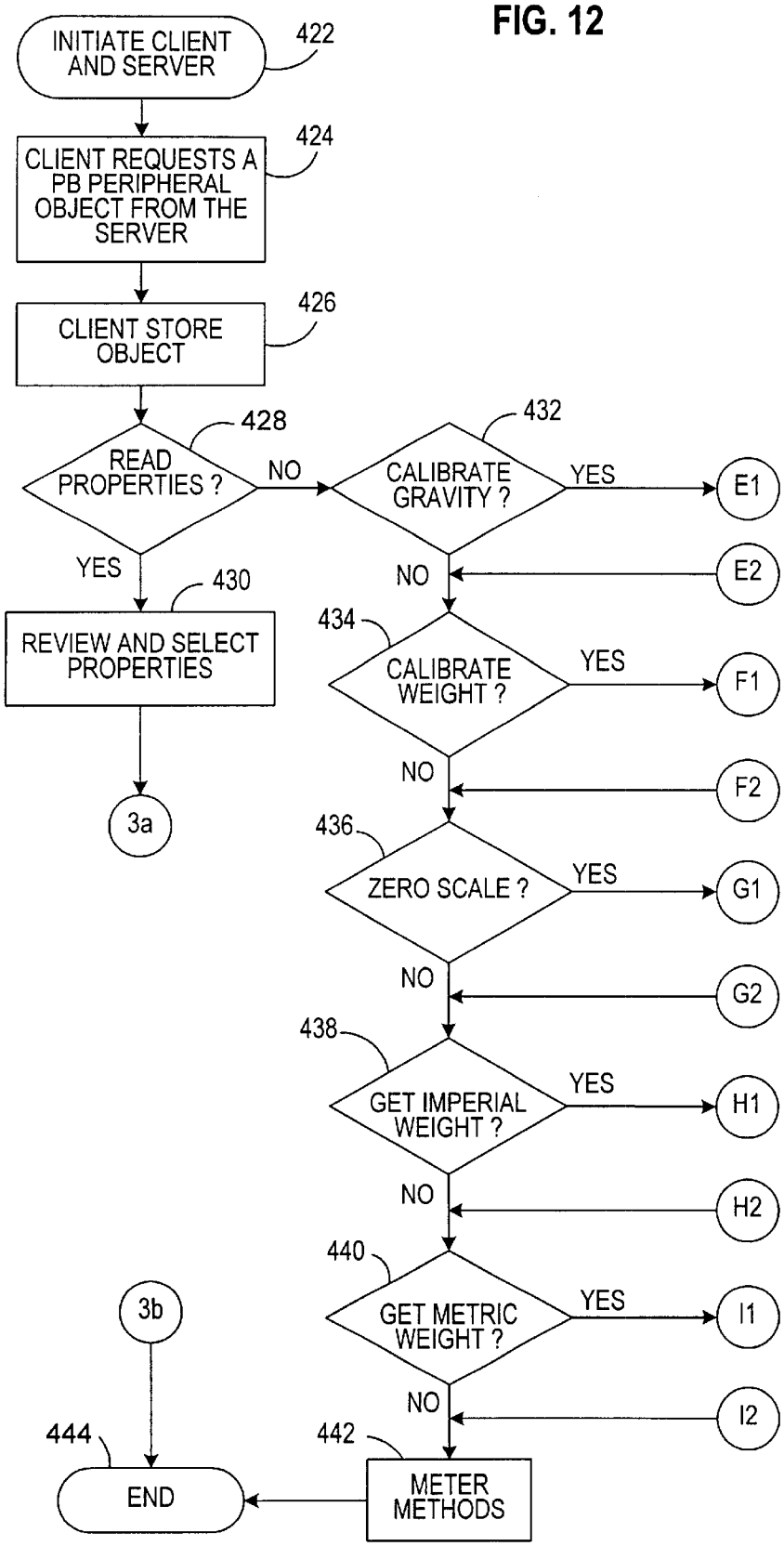
FIG. 12 is an upper level flowchart of the peripheral interface of the present invention.

Now turning to FIG. 12 shown is a flowchart of the method of creation and utilization of interface 400. The creation of interface 400 begins at step 422 where a system user initiates a client and a server. From step 422, the method advances to step 424 where the user instruct the client to select a peripheral object from the server. From step 424 the method advances to step 426 where the client stores the scale interface object. From step 426 the method advances to step 428 where the method inquires whether the user would like to read the scale properties. If the answer to the inquiry is yes the method advances to step 430 where the method continues at path 3*a*. If the answer to the query is no then the method advances to step 432 where the method inquires if the user would like to calibrate gravity. If the response to the query is yes then the method continues to path E1. If the response to the query is no the method continues to step 434 which inquires whether the user desires to calibrate the weight. If the answer to the query is yes then the method continues to path F1. If the response to the query is no then the method advances to step 436 where the method inquires whether the user desires to zero the scale. If the answer to the query is yes then the method continues to path G1. If the response to the query is no then the method advances to step 438 where the method inquires if the user would like to get imperial weight. If the response to the query is yes then the method continues to path H1. If the response to the query is no the method continues to step 440 which inquires if the user would like to get metric weight. If the response to the query is yes then the method continues to path I1. If the response to the query is no the method continues to step 442 where the meter methods may be selected in a similar manner as the selection of the scale methods. After the user has selected the desired meter methods the method advances to end at step 444. It should be noted that steps 432 through 442 may be performed in any order.

Figure 13:
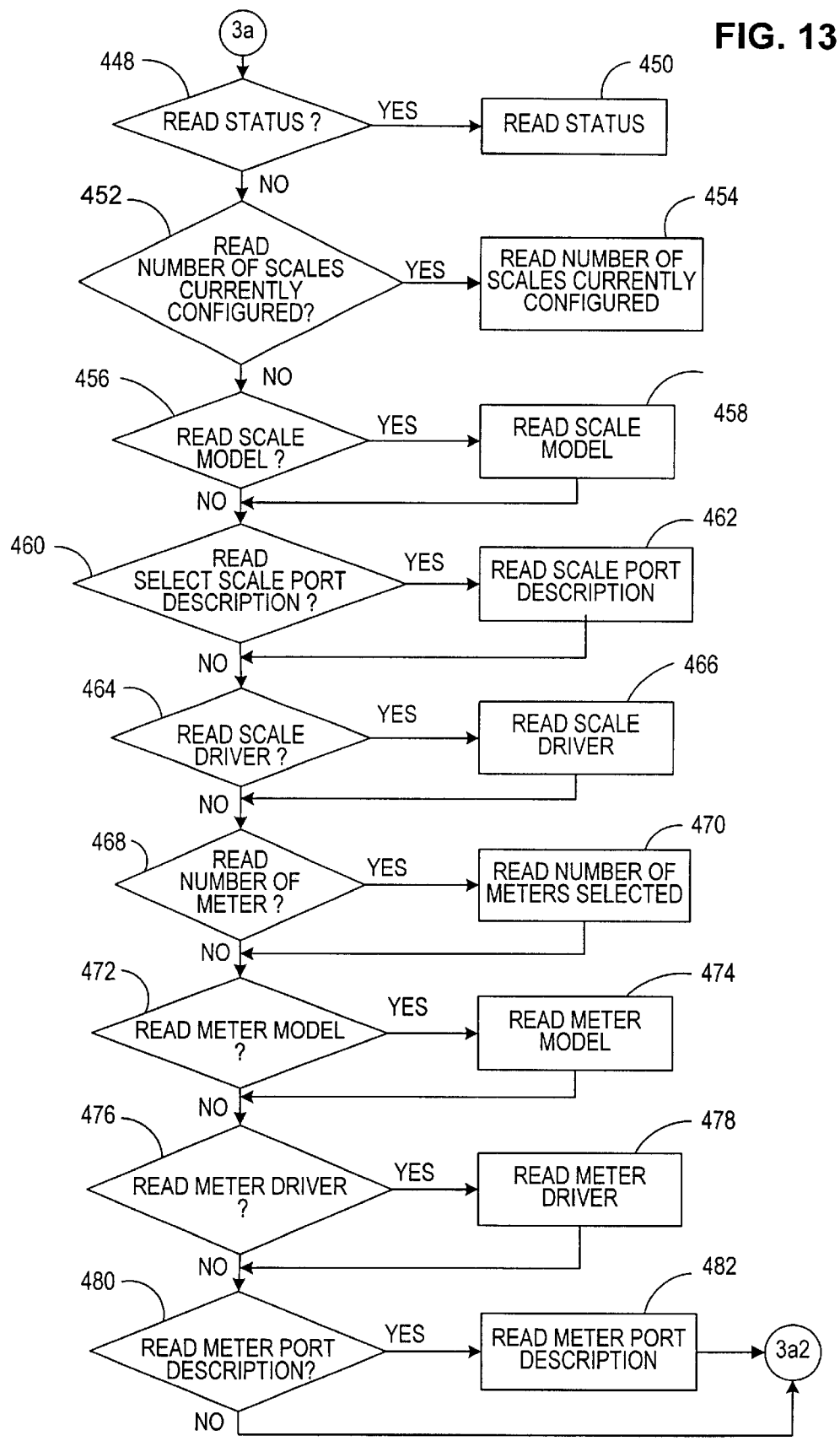
FIG. 13 is a flowchart of the peripheral interface properties of the present invention.

Now turning to FIG. 13, there is shown a flowchart of the method as it continues to path 3*a* and advances to step 448 where the method inquires it the user would like to read the status of the peripheral. If the answer to the inquiry is yes then method advances to step 450 where the user reads the peripheral status. If the answer to the query is no then the method advances to step 452 where the method inquires if the user wishes to read the number of scales currently configured. If the answer to the inquiry is yes then the method advances to step 454 where the user reads the number of scales currently configured. If the answer to the inquiry is no the method advances to step 456 where the method inquires if the user wishes to read the scale models property.

If the answer to the inquiry at step 456 is yes then the method advances to step 458 where the user reads the scale models property. If the answer to the inquiry is no the method advances to step 460 where the method inquires if the user wishes to read the select scale port description property. If the answer to the inquiry is yes then the method advances to step 462 where the user reads the select scale port description property. If the answer to the inquiry is no the method advances to step 464 where the method inquires if the user wishes to read the scale driver property. If the answer to the inquiry is yes then the method advances to step 466 where the user reads the scale driver property. If the answer to the inquiry is no the method advances to step 468 where the method inquires if the user wishes to reads the number of meters property. If the answer to the inquiry is yes then the method advances to step 470 where the user reads the number of meters property.

If the answer to the inquiry at step 470 is no the method advances to step 472 where the method inquires if the user wishes to read the meter model property. If the answer to the inquiry is yes then the method advances to step 474 where the user reads the meter model property. If the answer to the inquiry is no the method advances to step 476 where the method inquires if the user wishes to read the meter driver property. If the answer to the inquiry is yes then the method advances to step 478 where the user reads the meter driver property. If the answer to the inquiry is no the method advances to step 480 where the method inquires if the user wishes to read the meter port description. If the answer to the inquiry is yes then the method advances to step 482 where the user reads the meter port description description. If the answer to the inquiry is no the method advances to path 3*a*2.

Figure 14:
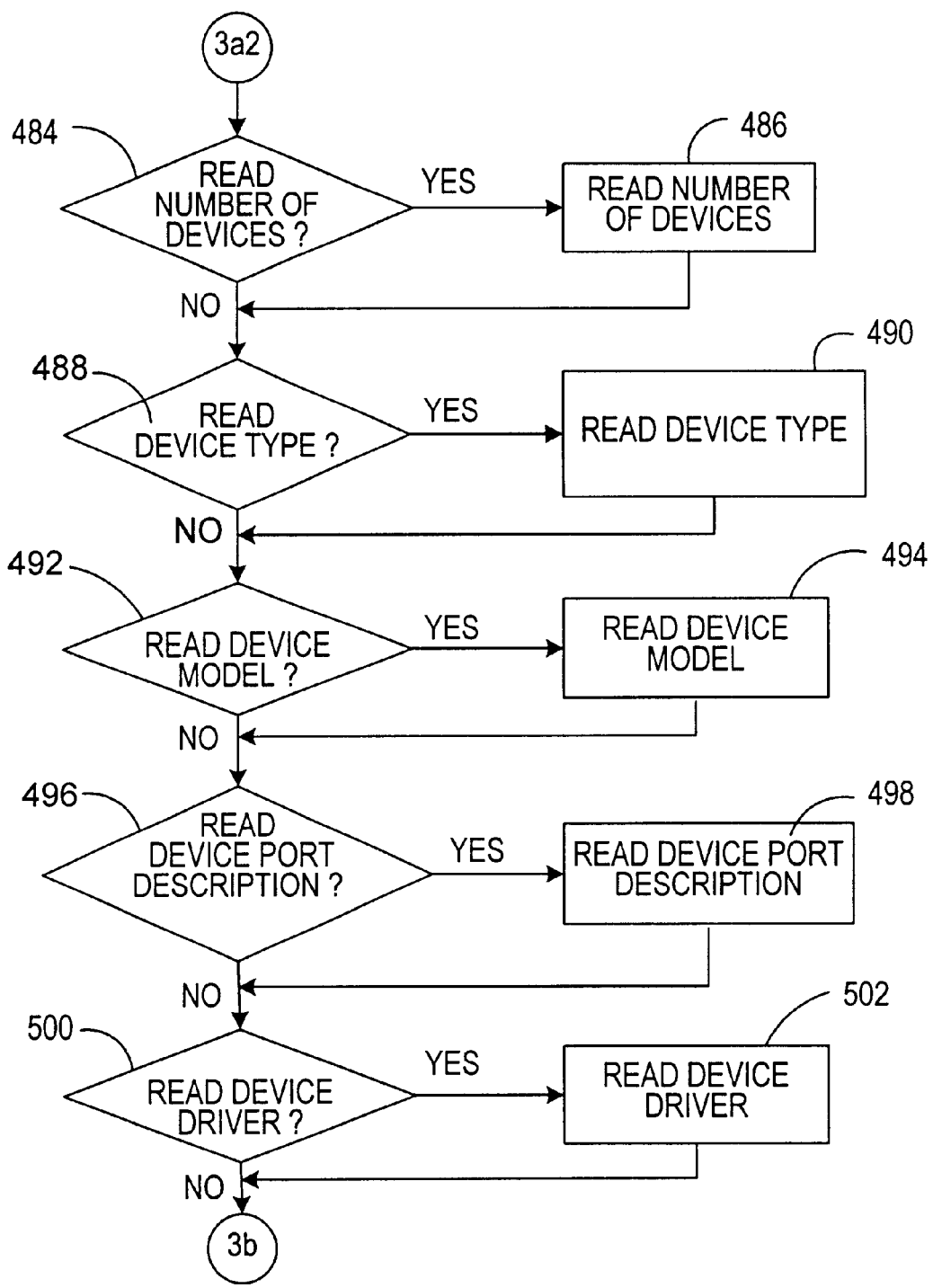
FIG. 14 is a continuation of flowchart 13.

The selection of properties continues a FIG. 14 at step 484 where the method inquires if the user wishes to read the number of devices that could be configured. If the answer to the inquiry is yes then the method advances to step 486 where the user reads the number of devices. If the answer to the inquiry is no the method advances to step 488 where the method inquires if the user wishes to read the device type.

If the answer to the inquiry at step 488 is yes then the method advances to step 490 where the user reads the device type. If the answer to the inquiry is no the method advances to step 492 where the method inquires if the user wishes to read the device model. If the answer to the inquiry is yes then the method advances to step 494 where the user reads the device model. If the answer to the inquiry is no the method advances to step 496 where the method inquires if the user wishes to read the device port description. If the answer to the inquiry is yes then the method advances to step 498 where the user reads the device port description. If the answer to the inquiry is no the method advances to step 500 where the method inquires if the user wishes to read the device driver. If the answer to the inquiry is yes then the method advances to step 502 where the user reads the device drive. If the answer to the inquiry is no the method advances to path 3*b*. It should be noted that the properties contained within steps 448 through 502 may be performed in an order.

Figure 15:
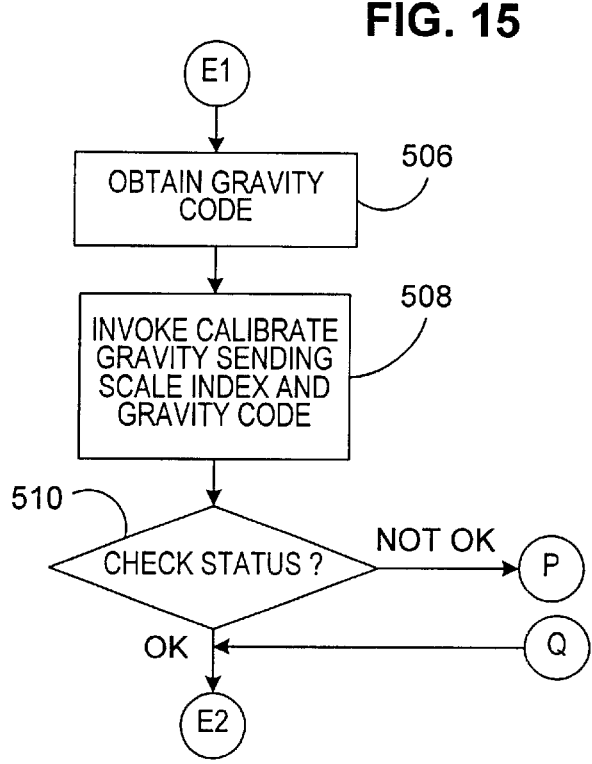
FIG. 15 is a flowchart of the peripheral interface calibrate gravity method of the present invention.

Now turning to FIG. 15, there is shown a flowchart of the calibrate gravity method. The method continues at path E1 and advances to step 506 where the method obtains a gravity code. The method then advances to step 508 where the method invokes a calibrate gravity and sending scale indexd and gravity code to the method. The method then advances to step 510 where the method inquires as to the completion status of the method. If the status is "not ok" the method proceeds to path P where error processing is performed. If the status is "ok" the method advances to path E2.

Figure 16:
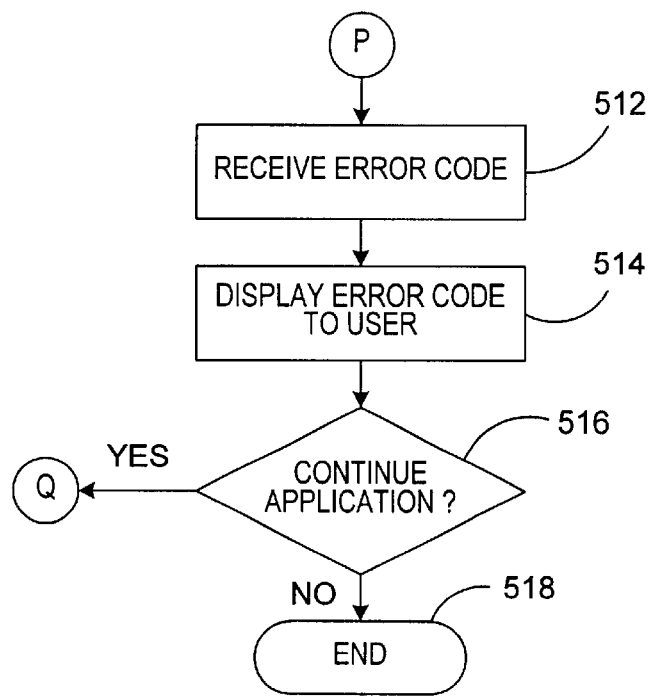
FIG. 16 is a flowchart of the peripheral interface error processing of the present invention.

Now turning to FIG. 16, there is shown a flowchart of the error processing for the second embodiment of the invention. The method continues to path P and advances to step 512 where an error code is received. The method then advances to step 514 where the method displays to the user the error code. The method then advances to step 516 where the method inquires whether the user wishes to continue the application. If the response to the query is yes the method advances to path Q. If the response to the query is no then the method advances to end at step 518.

Figure 17:
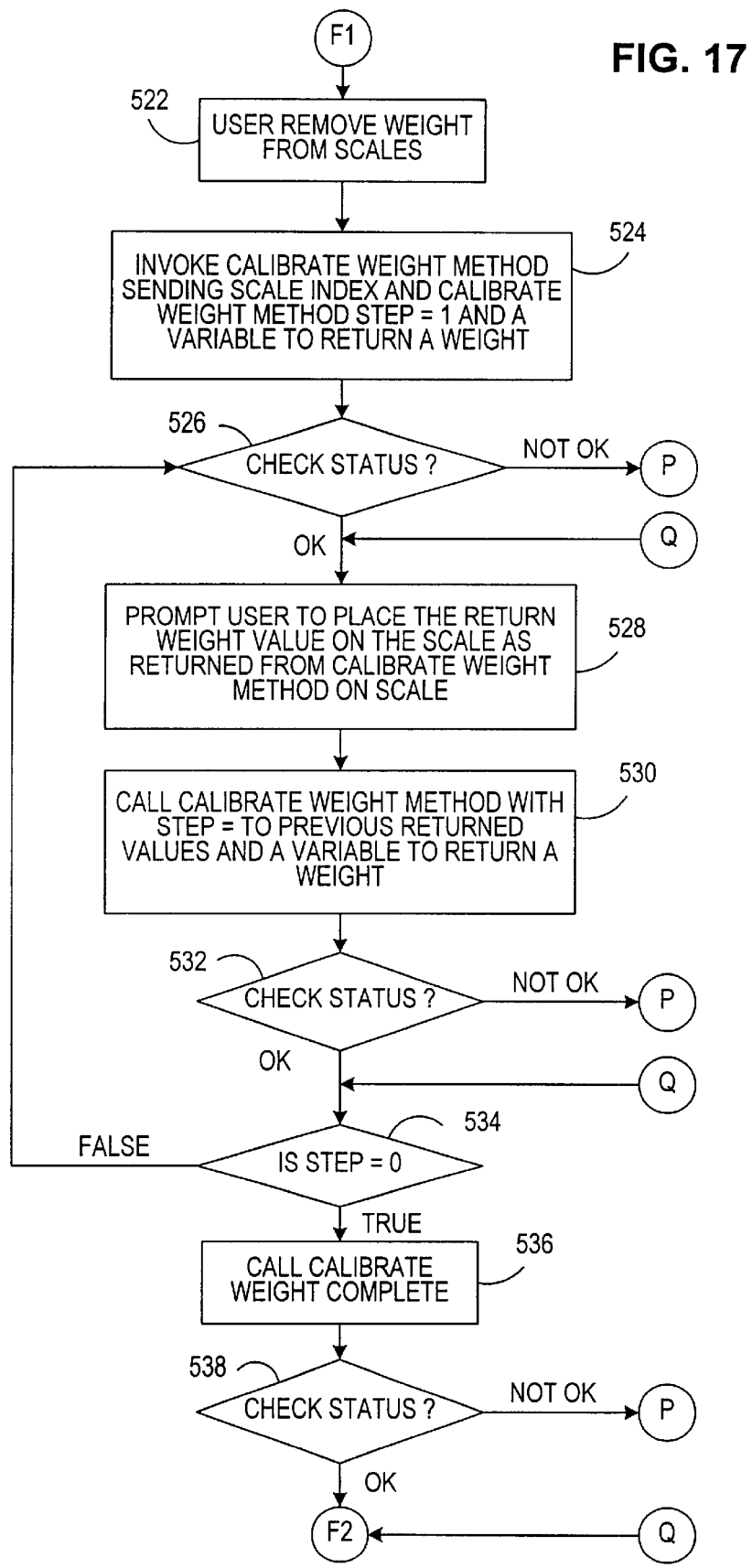
FIG. 17 is a flowchart of the peripheral interface of the calibrate weight method of the present invention.

Now turning to FIG. 17 there is shown a flowchart of the calibrate weight method. The method continues to path F1 and advances to step 522 where the user clears the scale of any weight. The method then advances to step 524 where the method invokes the calibrate weight method and sends scale index, the method a step =1 and a variable to return a weight. The method then advances to step 526 where the method inquires the status of the previous calibrate weight method step 524. If the response to the inquiry is "not ok" the method advances to path P. If the response to the inquiry is "ok" then the method advances to step 528 where the method prompts the user to place the returned weight value on the scale as returned values and a valuable to return a weight. The method then advances to step 530 where the method calls the calibrate weight method with step=to the previous returned values and a variable to return a weight. The method then advances to step 532 where the method inquires as to the status of the previously executes step 530. If the status is "not ok" the method advances to path P. If the status is "ok" the method advances to step 534 where the method inquires if the step is equal to =0. If the response to the query is "false" the method advances to step 526. If the response to the query is "true" the method advances to step 536 where the method calls the calibrate weight complete. The method then advances to step 538 where the method inquires as to the status of the previous step 536. If the response to the query is "not ok" then the step advances to path P. If the response to the inquiry is "no" the method proceeds to path F2.

Figure 18:
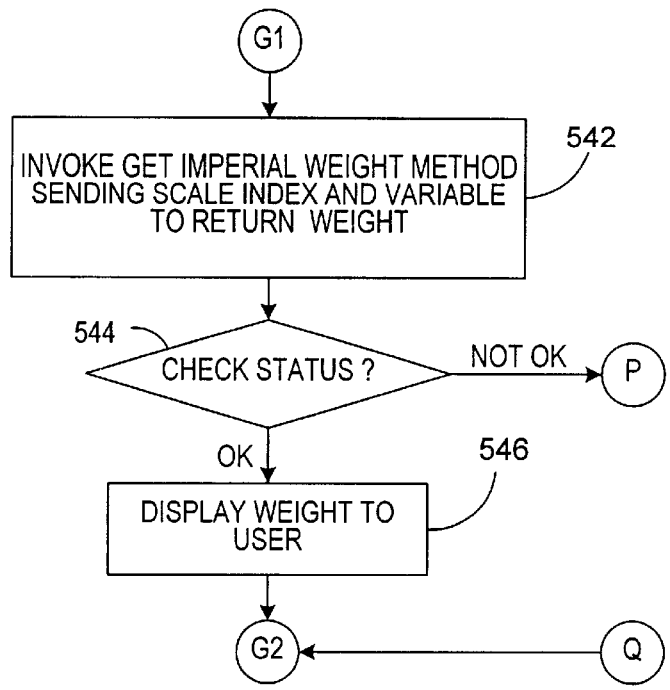
FIG. 18 is the peripheral interface get imperial weight method of the present invention.

Now turn to FIG. 18 there is shown a flowchart of the get imperial weight method. The method continues at path G1 and advances to step 542 where the method invokes imperial weight method sending scale and index variable to return a weight. The method then advances to step 544 where the method inquires as to the status of the previously executed step 542. If the response the query status is "not ok" then the method proceeds to path P. If the response to the query is "ok" then the method advances to step 546 where the value of the weight property can be used for a variety of applications including shipping applications, postage application and point of sales applications. The method then advances to path G2.

Figure 19:
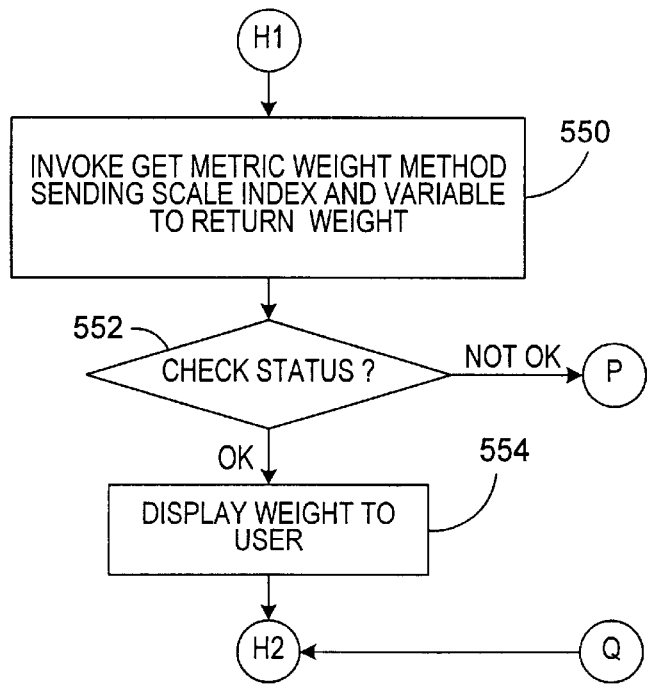
FIG. 19 is the peripheral interface metric weight method of the present invention.

Now turn to FIG. 19 there is shown a flowchart of the get metric weight method. The method continues at path H1 and advances to step 550 where the method invokes metric weight method sending scale and index variable to return a weight. The method then advances to step 552 where the method inquires as to the status of the previously executed step 550. If the response the query status is "not ok" then the method proceeds to path P. If the response to the query is "ok" then the method advances to step 554 where the value of the weight property is displayed to the user. The method then advances to path H2.

Figure 20:
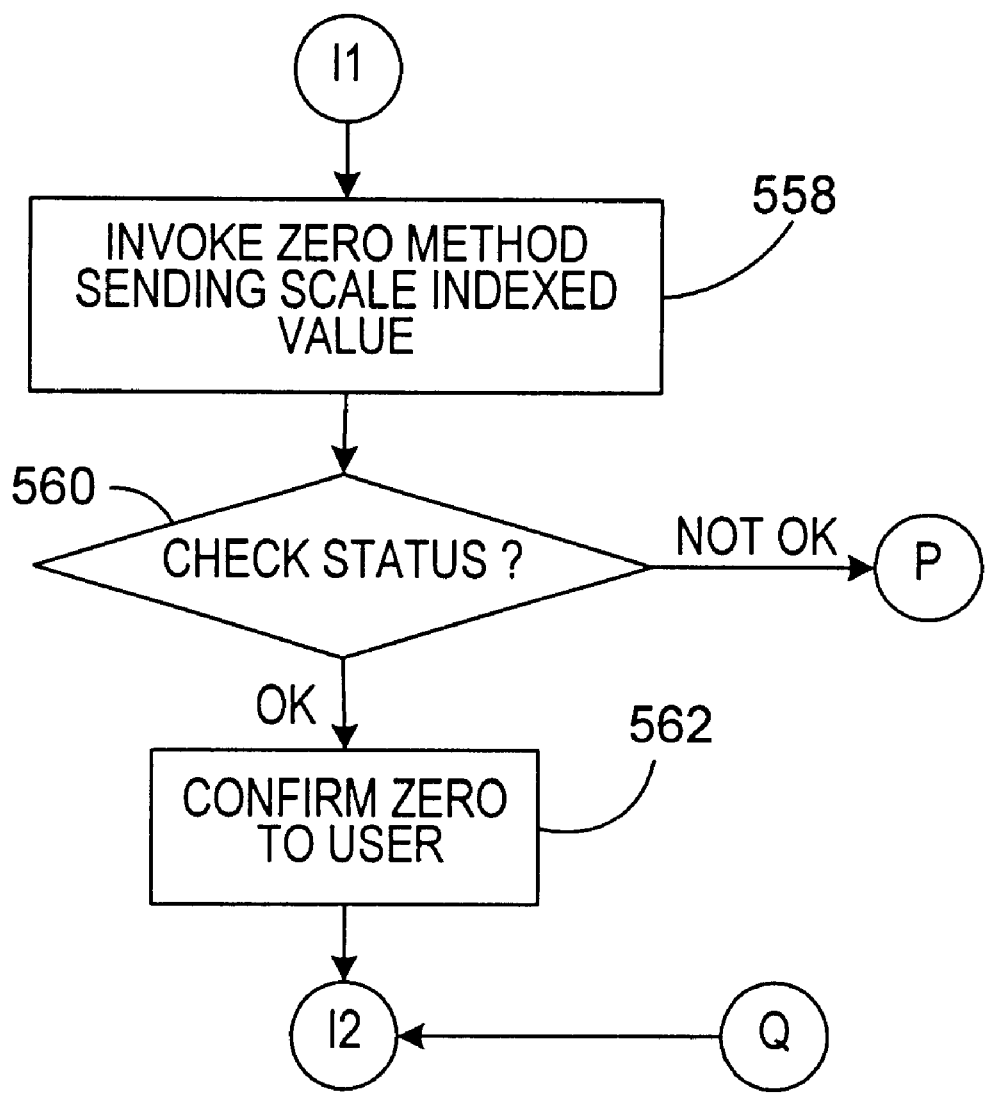
FIG. 20 is the peripheral interface zero scale method of the present invention.

Now turning to FIG. 20 is a flowchart of the zero scale method. The method advances to path I1 and advances to step 558 where the zero method is invoked the method then advances to step 560 where the method queries as to the status of the previously executed step 558. If the status is "not ok" the method advances to path P. If the response to the inquiry is "ok" the method advances to step 562 where zeroing of the scale is confirmed to the user. The method then advances to path I2. The object methods executed in this embodiment may be performed in any desired order.

While certain embodiments have been described above in terms of the systems within which the interface object may reside, the invention is not limited to such a content. The system of FIG. 1 is one example of a host system for the invention, and the system elements are intended merely to exemplify the type of peripherals and components that can be used with the invention.

In the foregoing specification, the invention has been described with reference to specific embodiments thereof. It will, however, be evident that various modifications and changes may be made thereto without departing from the broader spirit and scope of the invention. The specifications and drawings are, accordingly, to be regarded in an illustrative rather that a restrictive sense.

What is claimed is:

1. A method for providing a standardized interface between a client and a plurality of peripheral devices in a data processing system, comprising the steps of:

(a) initiating a client;

(b) initiating a server, said server including a server interface, a peripheral module and a server kernel to establish communication between said server interface and said peripheral module;

(c) requesting, through said client, an interface object from said server;

(d) establishing said interface object by:
  (i) storing a first set of object methods within said interface object by utilizing a first programming interface; and
  (ii) storing a first set of object properties within said interface object by utilizing said first programming interface;

(e) storing said interface object within said client;

(f) selecting a peripheral device from said plurality of peripheral devices;

(g) requesting through said client a peripheral object corresponding to said selected peripheral device from said server;

(h) establishing said peripheral object corresponding to said selected peripheral device by:
  (i) storing a second set of object methods within said peripheral object by utilizing a second programming interface; and
  (ii) storing a second set of object properties within said peripheral object by utilizing said second programming interface;

(i) storing said peripheral object within said client; and (j) implementing said first and said second properties and said first and said second methods thereby communicating between said client and said selected peripheral device under the direction of said client.

2. The method of claim 1, wherein said first and second set of object methods comprise action instructions; said action instructions further comprising display instructions for instructing said data processing system to display data on display means.

3. The method of claim 1, wherein said first and second set of object methods comprise action instructions; said action instructions further comprising printing instructions for instructing said data processing system to print data on output means.

4. The method of claim 1, wherein said peripheral module further comprises a set of data tables.

5. The method of claim 4, wherein said set of data tables comprises a gravity compensation table.

6. The method of claim 5, wherein said gravity compensation table comprises a zip code directory.

7. The method of claim 5, wherein said gravity compensation table comprises an area code directory.

8. The method of claim 5, wherein said gravity compensation table comprises a grid directory.

9. The method of claim 1, wherein said interface object establishes a human interface for allowing data to be displayed to a system operator under direction from said first and second object methods.

10. The method of claim 9, wherein said human interface comprises a link to a monitor.

11. The method of claim 9, wherein said human interface comprises a link to a printer.

12. The method of claim 1, wherein said peripheral device is a scale.

13. The method of claim 1, wherein said peripheral device is a meter.

14. A method for providing a standard interface between a client and a plurality of peripheral devices in a data processing system comprising the steps of:

(a) initiating a client;

(b) initiating a server, said server including a server interface, a peripheral module and a server kernel to establish communication between said server interface and said peripheral module;

(c) selecting a peripheral device from said plurality of peripheral devices;

(d) requesting through said client a peripheral interface object from said server;

(e) establishing said peripheral interface object corresponding to said selected peripheral device by:
  (i) staring a set of object methods within said peripheral interface object by utilizing a programming interface; and
  (ii) storing a set of object properties within said peripheral interface object by utilizing said programming interface;

(f) storing said peripheral interface object within said client;

(g) implementing said object properties and said object methods;

(h) utilizing said peripheral interface abject to communicate between said client and said selected peripheral device under the direction of said client.

15. The method of claim 14, wherein said object methods comprise action instructions; said action instructions further comprising display instructions for instructing said data processing system to display data on display means.

16. The method of claim 14, wherein said object methods comprise action instructions; said action instructions further comprising printing instructions for instructing said data processing system to print data on output means.

17. The method of claim 14, if wherein said peripheral module further comprises a set of data tables.

18. The method of claim 17, wherein said set of data tables comprises a gravity compensation table.

19. The method of claim 18, wherein said gravity compensation table comprises a zip code directory.

20. The method of claim 18, wherein said gravity compensation table comprises an area code directory.

21. The method of claim 18, wherein said gravity compensation table comprises a grid directory.

22. The method of claim 14, wherein said interface object establishes a human interface for allowing data to be displayed to a system operator under direction from said set of object methods.

23. The method of claim 22, wherein said human interface comprises a link to a monitor.

24. The method of claim 22, wherein said human interface comprises a link to a printer.

25. The method of claim 14, wherein said peripheral device is a scale.

26. The method of claim 14, wherein said peripheral device is a meter.

* * * * *